H. HAYES.
HOSE CLAMP.
APPLICATION FILED JUNE 4, 1918.

1,293,093.

Patented Feb. 4, 1919.

Inventor
H. Hayes.
By
Attorney

UNITED STATES PATENT OFFICE.

HUGH HAYES, OF MAPLETON DEPOT, PENNSYLVANIA.

HOSE-CLAMP.

1,293,093.  Specification of Letters Patent.  Patented Feb. 4, 1919.

Application filed June 4, 1918. Serial No. 238,165.

*To all whom it may concern:*

Be it known that I, HUGH HAYES, a citizen of the United States, residing at Mapleton Depot, in the county of Huntingdon and State of Pennsylvania, have invented certain new and useful Improvements in Hose-Clamps; and I do hereby declare the following to be a full, clear, and exact description of the invention, such as will enable others skilled in the art to which it appertains to make and use the same.

This invention relates to improvements in hose clamps, and has for one of its objects the provision of means for establishing a leak-proof connection between the coupling member and the hose, and which can be readily detached when desiring to remove the coupling member from the hose.

Another object of this invention is the provision of a split screw threaded clamping member constructed of resilient material positioned on the hose and adapted to have threaded thereon a sleeve for forcing the split ends thereof against the hose to clamp said hose on the coupling member.

A further object of this invention is the provision of a hose clamp of the above stated character, which will be simple, durable and efficient and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the following description and accompanying drawing, in which.

Figure 1:
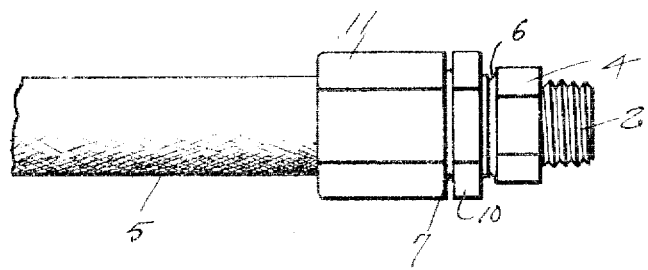
Figure 1 is a side elevation of a hose clamp constructed in accordance with my invention.
Figure 2:
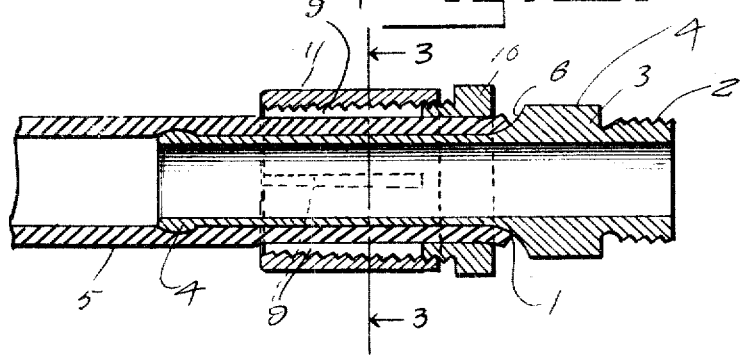
Fig. 2 is a vertical sectional view of the same.
Figure 3:
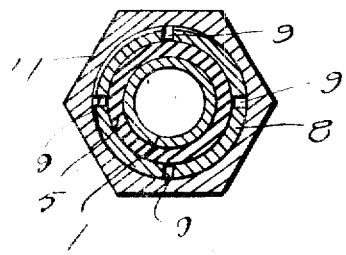
Fig. 3 is a transverse sectional view, taken on the line 3—3 of Fig. 2.
Figure 4:
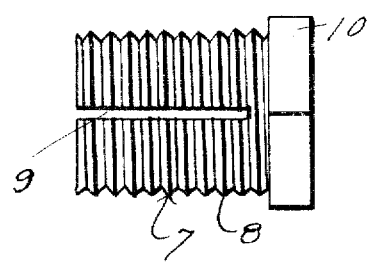
Fig. 4 is a side elevation of the clamping member.

Referring in detail to the drawing, the numeral 1 indicates a tubular member having formed upon one end a screw threaded male portion 2 adapted to fit within the usual female portion of a coupling, not shown. An enlarged portion 3 is formed upon the tubular member 1, adjacent the screw threads 2, and is provided with wrench engaging faces 4' for permitting a wrench or tool to be applied thereto for turning the male portion within the female portion of the coupling. The other end of the tubular member 1 is provided with an annular shoulder or bead 4 for engagement with the inner wall of a hose 5. The tubular member 1 is provided with an inclined face 6, adjacent the enlarged portion 3 for abutting engagement with the end of the hose, as clearly illustrated in the drawing.

The clamping member 7 is positioned over the hose 5 and tubular member 1 and consists of a tapered externally screw threaded sleeve 8, which is provided with slots 9 opening outwardly through one end to form gripping jaws, while the opposite end has formed thereon an enlarged portion 10, provided with wrench-engaging faces. An internally screw threaded sleeve 11 is adapted to be threaded onto the clamping member 7 to force the jaws thereof into engagement with the hose, causing the same to bind against the tubular member and coöperate with the bead 4 in establishing a leak-proof connection. The clamping member 7 is constructed from any resilient material suitable for the purpose, so that the clamping jaws thereof will readily yield under the influence of the sleeve 11.

While I have shown and described the preferred embodiment of my invention, it will be understood that minor changes in construction, combination and arrangement of parts may be made without departing from the spirit and scope of the invention as claimed.

Having thus described my invention what I claim is:

A hose clamp comprising a tubular member adapted to be inserted within one end of a hose, an enlarged portion formed upon said tubular member and having an inclined face for abutting engagement with the end of the hose, an externally screw threaded sleeve positioned upon the end of the hose and disposed over the tubular member and having slots opening outwardly through one end thereof to form gripping jaws, an enlarged portion formed upon the other end of the clamping member and having wrench-engaging faces, and an internally screw threaded sleeve threaded upon the clamping member to force the jaws thereof in engagement with the hose, and having wrench-engaging faces upon the exterior thereof.

In testimony whereof I affix my signature in presence of two witnesses.

HUGH HAYES.

Witnesses:
 A. F. PARKER,
 F. B. YOCUM.